(12) United States Patent
Lowry et al.

(10) Patent No.: US 8,913,116 B2
(45) Date of Patent: Dec. 16, 2014

(54) SYSTEMS AND METHODS OF CONTACT MONITORING

(75) Inventors: Jason Lowry, Salt Lake City, UT (US); Matthew Lawrence Page, Sandy, UT (US); Taylor Henry White, Holladay, UT (US); Nicholas Bauer Ramond, Draper, UT (US); Brian Douglas Minert, Orem, UT (US)

(73) Assignee: inContact, Inc., Midvale, UT (US)

( * ) Notice: Subject to any disclaimer, the term of this patent is extended or adjusted under 35 U.S.C. 154(b) by 378 days.

(21) Appl. No.: 13/348,460

(22) Filed: Jan. 11, 2012

(65) Prior Publication Data

US 2013/0176413 A1   Jul. 11, 2013

(51) Int. Cl.
*H04N 7/18* (2006.01)

(52) U.S. Cl.
USPC ............................................................ 348/77

(58) Field of Classification Search
None
See application file for complete search history.

(56) References Cited

U.S. PATENT DOCUMENTS

| 6,724,887 B1* | 4/2004 | Eilbacher et al. | 379/265.03 |
| 2011/0022962 A1* | 1/2011 | Luo et al. | 715/745 |
| 2012/0179637 A1* | 7/2012 | Juan et al. | 706/45 |
| 2012/0281820 A1* | 11/2012 | Hamerschlag et al. | 379/88.17 |

OTHER PUBLICATIONS

Kao et al., "Towards Text-based Emotion Detection—A Survey and Possible Improvements", 2009 International Conference on Information Management and Engineering, IEEE computer society, pp. 70-74, 2009.
Iliou et al., "Statistical Evaluation of Speech Features for Emotion Recognition", 2009 Fourth International Conference on Digital Telecommunications, IEEE computer society, pp. 121-126, 2009.
Fasel et al., "Automatic facial expression analysis: a survey", The Journal of the Pattern Recognition Society, Pergamon, pp. 259-275 May 15, 2001.
Epp et al., "Identifying Emotional States using Keystroke Dynamics", Department of Computer Science, University of Saskatchewan, CHI 2011 Session: Emotional States, pp. 715-724, May 7-12, 2011.
Ayadi et al., "Survey on speech emotion recognition :Features, classification schemes, and databases", Pattern Recognition, Feb. 4, 2009, pp. 572-587.
U.S. Appl. No. 13/348,462, Jul. 11, 2013.

* cited by examiner

*Primary Examiner* — William C Vaughn, Jr.
*Assistant Examiner* — Eileen Adams
(74) *Attorney, Agent, or Firm* — Maschoff Brennan

(57) ABSTRACT

Methods and apparatus for monitoring communication of contacts for identifying contacts for potential supervision are disclosed. The method can include electronically monitoring communication between an agent and a customer associated with a contact. The method can include monitoring the communication for one or more characteristics of the communication. The method can include automatically identifying, based on the one or more characteristics of the communication, that the contact includes a risk of producing a negative customer response. The method can include presenting the identified contact to a supervisor.

18 Claims, 7 Drawing Sheets

Priority Contacts — 200

| | Supervision | Agent Name | Team | Type | Wait | Agent | Total | Notes |
|---|---|---|---|---|---|---|---|---|
| ● | Agent QA | Tom Smith | Customer Care | Phone | 3:50 | 0:22 | 4:12 | |
| ! | Urgent | Sam Horn | Sales | Chat | 0:40 | 1:16 | 1:56 | Negative Mood |
| | Training | Sally Jones | Tech Support | Video Call | 7:09 | 10:15 | 17:24 | |

202A ●
204 !
202B
202C

Current Contact — 218

General 220

| | Agent 224 |
|---|---|
| Team: Customer Care | Name: Tom Smith |
| Media: Phone | Training Required: New Agent (3) |
| Origin: Inbound | Quality Assurance: 2 In Next 10 Days |
| State: Active | |
| Times: Wait: 3:50 Agent: 0:22 Total: 4:12 | Customer 222 |
| Topic: Overdraft Penalty | Name: Felma |
| Notes: | Address: South Main Street |
| | Salt Lake City, UT 84111 |
| | Notes: Customer Has Called 3 Times In Last 30 Days — 238 |

246 ◁ | 242 ‖ | 244 ▷

Scan: ON | OFF — 234    Whisper 228

226    Barge In 230

Dwell: 0:20 | + | −    — 240, 236    Take Over 232

*Fig. 2A*

Priority Contacts

| | Agent | | | | |
|---|---|---|---|---|---|
| | Name | State | Skills | Training Outstanding | QA Requirments | Notes |
| ● | Tom Smith | Active | Cust Care, Sales | New Agent (3) | 2 In Next 10 | |
| | Sally Jones | Active | Tech Support, Sales | Sales (4) | None | |
| | John Davis | Active | Tech Support | New Agent (1) | 3 In Next 5 | Start Of Shift |

Tabs: Agent / Contact / Combined (206, 208, 210)

Rows: 202A, 202B, 202C

Current Contact 220

General 218

Team: Customer Care
Media: Phone
Origin: Inbound
State: Active
Times: Wait: 3:50  Agent: 0:22  Total: 4:12
Topic: Overdraft Penalty
Notes:

Agent 224

Name: Tom Smith
Training Required: New Agent (3)
Quality Assurance: 2 In Next 10 Days

Customer 222

Name: Felma
Address: South Main Street
Salt Lake City, UT 84111
Notes: Customer Has Called 3 Times In Last 30 Days Scan: ON [OFF] — 234
226

Dwell: [0:20] [+][-] — 236, 240

238 — [◁] [||] [▷] — 246, 242, 244

[Whisper] 228
[Barge In] 230
[Take Over] 232

Priority Contacts 200

| Supervision | Agent Name | Team | Type | Wait | Agent | Total | Notes |
|---|---|---|---|---|---|---|---|
| • Supervision | Tom Smith | Customer Care | Phone | 3:50 | 0:22 | 4:12 | |
| ! Urgent | Sam Horn | Sales | Chat | 0:40 | 1:16 | 1:56 | Neg Mood |
| Training | Sally Jones | Tech | Video | 7:09 | 10:15 | 17:24 | |

202

Current Contact 218

General 220

Team: Customer Care
Media: Phone
Origin: Inbound
State: Active
Times: Wait: 3:50  Agent: 0:22
        Total: 4:12
Topic: Overdraft Penalty
Notes:

Agent 224

Name: Tom Smith
Training Required: New Agent (3)
Quality Assurance: 2 In Next 10 Days

Customer 222

Name: Felma
Address: South Main Street
         Salt Lake City, UT 84111
Notes: Customer Has Called 3 Times In Last 30 Days

[ Whisper ]
[ Barge In ]
[ Take Over ]

Scan: ON [OFF]  226
Dwell: [0:20] [+] [-]

Agent: Tom Smith  302            Customer: Felma

Agent Workstation Display 304

Contact Name: Felma
Contact Address: 555 South Main Street
                 Salt Lake City, UT 84111
Account Number:
Account Balance:
Contact Topic: Overdraft Penalty

Account Managment Group 306

| Agent Name | Status | Time | Team |
|---|---|---|---|

Detailed Company Data To Help Solve Contact's Problem.

*Fig. 3*

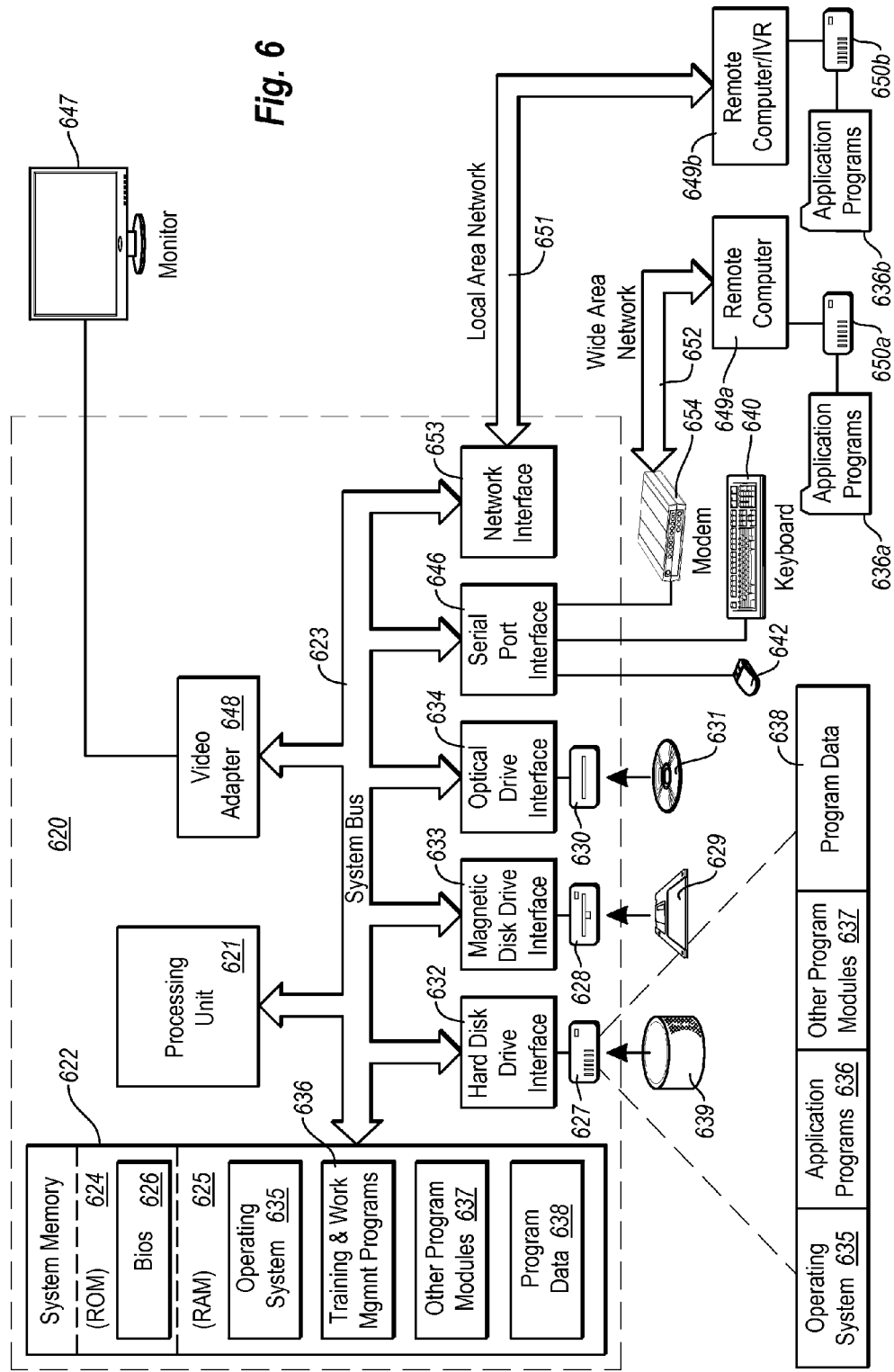

SYSTEMS AND METHODS OF CONTACT MONITORING

CROSS REFERENCE TO RELATED APPLICATIONS

This application relates to co-filed U.S. patent application Ser. No. 13/348,462 entitled "SYSTEMS AND METHODS OF SUPERVISING CONTACTS" filed on Jan. 11, 2012.

BACKGROUND OF THE INVENTION

1. The Field of the Invention

The present disclosure relates generally to the supervision of contacts in a contact handling system. More specifically, the disclosure relates to systems and methods for monitoring communication of contacts for identifying contacts for potential supervision.

2. The Relevant Technology

An important activity in managing a contact handling system regards the monitoring of agents for evaluation and training purposes. The traditional contact handling system consisted at one time of a call center composed of rows of telephone-based agents who make or answer telephone calls. Over time, contact handling systems have evolved to handle contacts over a variety of media types (telephone, fax, email, SMS, instant message, etc.).

Contact handling system supervisors are responsible for the performance of the agents assigned to them (the team). The supervisors often monitor communication, such as a phone call, between the agent and customer in order to evaluate the competence and effectiveness of their agents. Agent monitoring capabilities have improved over time, progressing from rudimentary eavesdropping or clumsy conferencing of phone calls to, in some instances, less-invasive systems where video, audio, or other communication from the agent and customer are combined and made available to the supervisor. Many modern contact handling systems also allow the supervisor to communicate with an agent and/or customer, including communicating with the agent without the customer being aware of it.

Supervisors monitor agents for a number of reasons, including: (1) on-the-job training, (2) quality assurance, (3) triage, (4) takeover, and/or (5) poor team performance. These example reasons are discussed in more detail below.

1. On-the-Job Training.

Supervisors may monitor contacts to provide agents with on-the-job training. This is particularly useful with new agents and/or agents new to a product or process, as they can quickly progress from classroom training to taking contacts. Supervisors may monitor these early contacts and instruct the agent during contacts without the customer being aware of the supervisor. The industry often refers to this instruction during the contact as "coaching" or "agent whisper." In urgent situations, the supervisor may need to speak to both the agent and the customer in order to correct a problem. This sudden interruption is often referred to in the industry as "barge in."

2. Quality Assurance.

The supervisor monitors a customer contact to evaluate the performance of the agent in areas such accuracy (giving the proper information), attitude (positive and cheerful), competency (able to use the business software, negotiate resolutions), etc. Feedback is later given by the supervisor to the agent. There are often targets that supervisors must meet in terms of monitoring a certain number of contacts per new agent or a certain number of contacts per month per agent.

3. Triage.

When a customer relationship is rapidly degrading during a contact (e.g. the customer becomes angry), the supervisor may monitor the contact and may coach the agent and/or barge in if needed to try to improve the customer relationship. For example, the supervisor can offer the customer discounts or incentives that the agent is not authorized to offer.

4. Takeover.

If the agent cannot or should not remain engaged with the customer, the supervisor may choose to barge in and remove the agent from the contact.

5. Poor Team Performance.

When a number of agents on the team are poorly trained or unmotivated, customers calling in to the team may become frustrated with the service being provided by the team, reflecting poorly on the company represented by the contact handling system. Typical indicators of poor team performance include:

contacts that have exceeded the average handling time;
contacts that have been transferred (re-skilled or re-agented);
contacts that have been refused (the agent's phone rings without answer); and
contacts that have been escalated to supervisors.

Each of the foregoing example cases represents a risk to the perceived quality of service by the business, which by inference becomes a measure of the quality of care provided by the contact handling system. By monitoring the right contacts at the right time the supervisor can improve the quality of care indirectly (by increasing agent training levels and motivation) and directly (by triage or takeover of the customer contact).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

This Summary is provided to introduce a selection of concepts in a simplified form that are further described below in the Detailed Description, but are not necessarily described in their broadest form. This Summary is not intended to identify key features or essential characteristics of the claimed subject matter, nor is it intended to be used as an aid in determining the scope of the claimed subject matter Embodiments disclosed herein relate to methods and systems for monitoring communication of contacts in a contact handling system for identifying contacts for potential supervision. The method can include electronically monitoring, using a computer, communication between an agent and a customer associated with a contact. The communication can be monitored for one or more characteristics of the communication. The method can include automatically identifying, based on the one or more characteristics of the communication, that the contact includes a risk of producing a negative customer response. The identified contact can be presented to a supervisor.

The contact handling system can include a media server, which handles connection paths for contact media. The contact handling system can further include an automatic contact distributor, which tracks the state of each contact and agent, supplying idle agents with waiting contact media. The contact handling system can further include an interactive voice response unit, which provides pre-recorded audio prompts to incoming voice contact media. The contact handling system can further include storage for storing redacted data received from the agent workstation along with other electronic files. The contact handling system can further include a contact handling network connected to telephony and/or outside packet-based network.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2A illustrates a supervisor workstation display with priority contacts presented according to an embodiment;

FIG. 2B illustrates a supervisor workstation display with agent-focused priority contacts presented according to an embodiment;

FIG. 3 illustrates a supervisor workstation display with priority contacts presented and additional supervision information according to an embodiment;

FIG. 6 provides a brief, general description of a suitable computing environment in which several embodiments may be implemented.

DETAILED DESCRIPTION OF THE PREFERRED EMBODIMENTS

Figure 1:
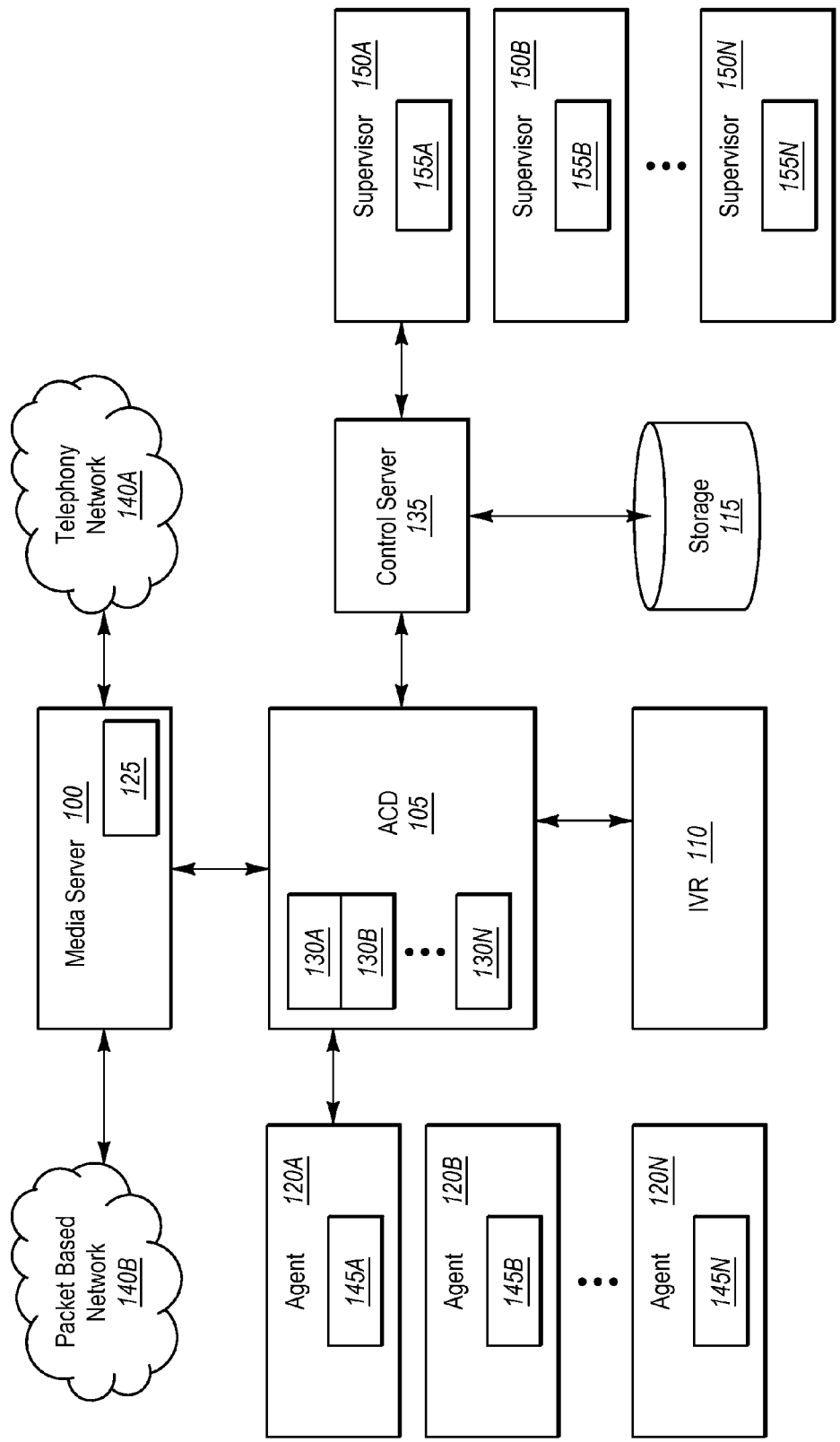
FIG. 1 illustrates an example embodiment of a contact handling system.

Embodiments of the invention relate to methods and systems for improving contacts in a contact handling system. Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

When a customer in a contact perceives that the customer is receiving poor service during the contact, it reflects poorly on the company represented by the agent and on the company providing contact handling services if different from the represented company. Perceptions of poor service may often be avoided or lessened through direct supervision of the contact, agent training, and agent quality assurance; as the quality of care can be improved by supervisors directly and/or indirectly. For example, supervision can directly improve the contact through coaching, barging in, or taking over the contact. Indirectly, supervision of priority contacts can allow a supervisor to help an agent develop skills and techniques to handle future contacts without supervision. However, a supervisor is typically unable to monitor every contact handled by the supervisor's team to identify contacts with unsatisfied customers and to provide training and agent quality assurance as required. Thus, the quality of care can be efficiently improved by identifying contacts that a supervisor's time would be best spent monitoring and presenting the identified contacts to supervisors in a way that allows efficient supervision.

However, contact handling systems offer insufficient or crude methods for a supervisor to specify, by attribute, the choice of contacts to monitor. Currently, selection of a contact to monitor by a supervisor is often agent-centric. For example, a supervisor may cycle through a list of agents or may select a particular agent (e.g. a new agent) to monitor that agent's contact. The selection mechanism is most often manual (e.g. navigate a user interface using a mouse). In addition, the amount of time the supervisor spends listening to a given conversation is random (e.g. the listening time depends on the tone of the conversation as perceived by the supervisor). By improving the ability of supervisors to efficiently monitor contacts having particular characteristics, the contact handling system can be improved both directly and indirectly.

In some embodiments, priority factors are set, contact characteristics are evaluated in light of the priority factors, and contacts are presented to the supervisors in a manner that allows increased monitoring of identified priority contacts. The quality of contact handling systems is improved by focusing supervisor resources on contacts where supervision is most likely to help improve supervisor efficiency and contact handling system quality. For example, by presenting and/or delivering contacts for supervisor review that are likely to require supervisor attention or will otherwise allow a supervisor to perform the supervisor's duties, supervisor resources are more closely focused on the act of providing supervision rather than spending time identifying contacts to supervise. Presenting and/or delivering priority contacts to a supervisor can also allow better supervision of high-risk contacts, as the current risk level of all contacts can be considered. Automatically presenting priority contacts also lessens inefficiencies created when a supervisor decides to monitor a particular promising contact, but higher-risk contacts were not considered in the supervisor's effort to save time. In some embodiments, supervisor efficiencies can be improved by presenting a higher portion of contacts that allow a supervisor to work towards training and quality assurance quotas during periods with relatively low numbers of high-risk contacts. In an example embodiment, efficiency is improved by allowing a supervisor to work towards training and/or quality assurance quotas when such contacts are available.

1. Examples of Components of Contact Handling Systems

FIG. 1 illustrates an example of a contact handling system according to one embodiment. Components of the contact handling system can include media server(s) 100, an automatic contact (or call) distributor (ACD) 105, an interactive voice response (IVR) unit 110, storage 115, agents 120A-N agent workstations 145A-N (collectively referenced as "145"), supervisors 150A-N (collectively "150"), supervisor workstations 155A-N (collectively "155") and contact networks 140A and B (collectively "140"), for example.

The media server(s) 100 handle the connection paths for contact media 125 types such as phone calls, short message service (SMS) messages, multimedia messaging service (MMS), instant messages, fax, conferencing, video conferencing, co-browsing, social media channels, video calling, etc. Media recordings can take place in the media server 100. Media servers 100 can include the traditional telephony PBX (Private Branch eXchange), computer servers handling internet telephony traffic (Voice over Internet Protocol, or VoIP), voice gateways, etc.

The ACD component 105 can track the state of each contact 130 and agent 120A-N (collectively "120"), supplying available agents 120 with waiting contacts 130A-N (collectively "130"). The ACD controls the routing of media to/from agents 120.

IVR units 110 can be used as the first stage of handling an incoming call. The process usually starts by playing pre-recorded audio prompts (e.g. menu selection choices), and accepting handset touch-tone key presses or Automatic Speech Recognition (ASR) to navigate a menu system to supply automated information (such as business address, hours of operation, etc.) or be routed to an agent 120 via the ACD 105.

Storage 115 can include organized computer disk drives as databases and files. Recordings of phone calls, videoconferencing sessions, instant messaging sessions, and other interactions with customers may be stored on the storage 115 for later reference or review. Many aspects of contact handling system activity can be recorded and stored in the storage 115.

Media server(s) 100, ACD 105, IVR(s) 110 and storage 115 are often referred to as "back office" equipment, referring to restricted-access supervisor workstations 155 and control computers 135 located in server rooms at the contact handling system where these types of equipment are traditionally installed and operated. Functional lines between them are often blurred, meaning that there are various solutions which may combine or distribute the functions of these servers and storage. For example, certain IVR functions can be done in media gateways.

Network connections to traditional telephony 140A and/or packet-based networks 140B are generally needed to receive contacts 130 and otherwise interconnect the ACD 105 to the other elements of the contact handling system.

The location of media servers 100, ACD 105 and storage 115 can be at the physical location of the contact handling system representing the business. More recently, these "on-premises" solutions can be supplemented, or replaced, by "cloud-based" systems, where the media servers 100, ACD 105 and/or storage 115 may be operated far from the traditional contact handling system, and use longer network connections to deliver contact handling system functionality to agents 120, be it at home or at more-traditional contact handling system facilities. In addition, cloud-based solutions can provide a multi-business hosting model, where various businesses are delivered contact handling system functionality via cloud-based equipment which is shared among the businesses, with appropriate safeguards for privacy and data security.

Agent workstations 145 and/or supervisor workstations 155 may include traditional desktop computers and phones. Agent and/or supervisor workstations can also include more-portable electronics such as laptop computers, netbooks, internet-capable phones or tablets. Software running on these devices typically includes business applications and programs to interface with the contact handling system, but may extend to programs which can facilitate the inventions disclosed herein. Agent workstations allow agents to receive contacts and communicate with customers over a number of media types. Supervisor workstations allow supervisors to receive information on the characteristics of contacts being handled by the supervisor's team and to monitor particular contacts when monitoring a contact, a supervisor can receive communication of the agent and customer through the supervisor workstation, as well as other details of the contact. For example, a supervisor may monitor a contact by watching and listening to a videoconference between a customer and an agent. The supervisor workstation can also receive and display data regarding the agent's workstation, possibly including an image of any displays of the agent workstation. Steps may be taken to ensure the confidential handling of sensitive information. The supervisor workstation can also allow a supervisor to receive a contact and otherwise function as an agent workstation, to allow a supervisor to conduct a contact, for example, when a contact is taken over by a supervisor. Agent and supervisor workstations can also allow the supervisor and agent to communicate without the customer in the contact being aware.

2. Example Embodiments at a Supervisor Workstation

FIG. 2A illustrates an example of a supervisor workstation 200 graphical user interface display according to an embodiment. Contacts can be presented to the supervisor via representations of the contacts 202A-C (collectively 202) at the workstation display. Contact representations 202 can be selected by the contact handling system based on characteristics of contacts so that the contacts represented are priority contacts. The contact representations 202 are illustrated in list form; however, other ways to display the contact representations are contemplated, including a grid, e.g., "tiled" form. Preferably, the order of the presented contact representations and the contacts presented are regularly updated to reflect continuously changing characteristics of the contacts and circumstances of the contact handling system. In several embodiments, presented contact representations can be selectable such that contact media is delivered to the supervisor via the supervisor workstation or otherwise allows the supervisor to receive information concerning the represented contact and/or monitor the contact upon selection.

In some embodiments, information on the individual contacts can be included with the contact representation 202. Any information about the contact can be displayed. Information displayed can include the type of recommended supervision, for example, training for new agents and/or particular skills, quality assurance, high-risk contacts, etc. Information displayed can also include a priority score assigned to the contact. For example, the priority score can be a numerical score, a classification such as "high," "medium" or "low," or may not be used at all. In some embodiments, the contact representations can visibly reflect the relative priority, e.g., through color, brightness, animation such as flashing, or some other method. In some embodiments, information displayed may include the agent name, agent state (e.g. available, on call, in wrap-up, etc.), skills assigned to the agent, outstanding training requirements, quality assurance requirements, assigned queue of the contact, contact media type, customer wait time, the length of time the wait time exceeded the service level agreement (SLA), whether the contact was transferred or re-agented or escalated, the time the customer has spent conversing with the agent, total time of contact, and notes for the supervisor concerning the contact. An indicator 204 can be included, for example, to draw the supervisor's attention or highlight information about the represented contact. In some embodiments, a supervisor can change the information displayed and/or the manner in which it is displayed. In certain embodiments, a supervisor can sort and/or filter contact representations 202, for example, the representations can be sorted by the length of time the represented contact's SLA was exceeded, or can be filtered so only contacts assigned to a particular queue such as sales or tech support, or defined as "gold standard" by an SLA are presented.

Figure 2C:
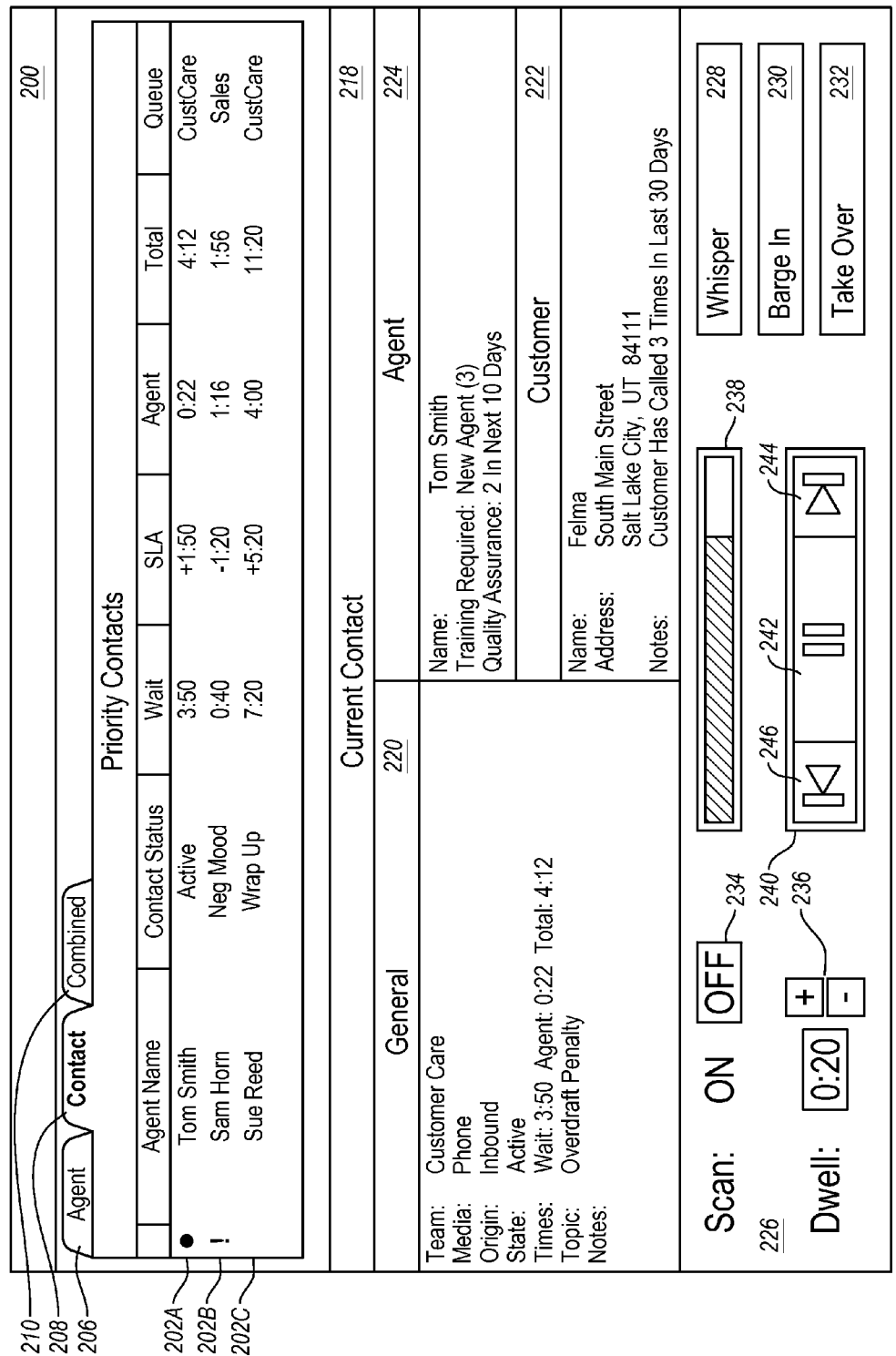
FIG. 2C illustrates a supervisor workstation display with contact-focused contacts presented according to an embodiment.

Contacts presented to a supervisor can be chosen and displayed according to different criteria. Referring to FIG. 2B, in an example embodiment, agent information tab 206 can be selected to display agent-centric information. Determining which contacts to present to the supervisor can focus on agent training and/or quality assurance requirements in determining priority contacts. Presenting agent-centric information and presenting contacts based on agent training and/or quality assurance requirements can allow a supervisor to focus on meeting training and quality assurance quotas. Referring to FIG. 2C, contact information tab 208 can be selected to display contact-centric information. Determining which contacts to present to the supervisor can focus on identifying contacts with a relatively high risk of producing unsatisfied customers. Presenting contact-centric information and presenting contacts based on the risk of producing unsatisfied customers can allow a supervisor to focus on preventing contacts from producing unsatisfied customers. Other focuses can be used for displaying and presenting contacts to a supervisor, for example, new agents with new agent training requirements. A combination tab 210 can be selected to combine the agent-centric and contact-centric display and presentation. Combining the agent- and contact-centric presentations can permit a supervisor to simply handle the highest-priority contacts, regardless of whether the supervisor is to provide training or quality assurance, or ensure a proper quality of service. Contacts needing different types of supervision can be combined into a single presentation in a number of ways. In an example embodiment, training, quality assurance, and high-risk contacts are presented to the supervisor in a fixed ratio, for example, one training contact for every four high-risk contacts. In another example embodiment, contacts are evaluated on a similar scale regardless of the type of supervision needed, i.e., more contacts requiring quality assurance evaluation are presented to a supervisor when there are few contacts with a high-risk of producing unsatisfied customers. In yet another example embodiment, high-risk contacts that also allow a supervisor to perform training and/or quality assurance evaluations are given an efficiency bonus and are more likely to be presented to the supervisor.

In some embodiments, the supervisor workstation can display detailed information 218 about the contact the supervisor is currently monitoring. Detailed information 218 can also be provided for contacts the supervisor is not monitoring. In an example embodiment, a supervisor can choose to display detailed information about a presented contact without receiving the media of the contact, e.g., so the supervisor can potentially determine whether to monitor the contact. Detailed information 218 can include information similar to the types of information already described, but can also include additional information that may be relevant as the supervisor monitors the contact. Detailed information can include general information about the contact 220. Detailed information can also include customer information 222, for example, the customer's name, address, etc. Information concerning the agent 224 can also be provided, for example, the agent's name and training and quality assurance information.

In several embodiments, controls 226 can be provided to allow the supervisor to interact with the prioritizing and monitoring system. Controls 226 can include the ability for a supervisor to toggle scanning on and off 234. Scanning can cause the contact presented to a supervisor to automatically switch after a particular amount of time. In certain embodiments, when scanning is employed, a contact, including its media, is automatically delivered to the supervisor for monitoring. If the supervisor does not intervene, the contact is replaced after a dwell time by another contact for the supervisor to monitor. Until the supervisor intervenes, the current contact is repeatedly replaced by another contact after the dwell time. The dwell time is the length of time that passes before a contact is replaced. The supervisor workstation can include dwell time controls 236 for setting and/or changing the dwell time. In certain embodiments, an indicator 238 can represent the length of time remaining before the current contact is replaced. In some embodiments, different dwell times can be used for different types of contacts, for example, a contact identified as a priority contact for training and/or quality assurance reasons can be given a longer dwell time than a contact identified as a high-risk contact. The indicator 238 can be an abstract representation or an actual timer. The controls 226 can be provided on the display of the supervisor workstation, on a different display, or may be provided by hardware controls, for example, with physical buttons.

In some embodiments, navigation controls 240 can allow a supervisor to control delivery of contacts beyond contact scanning. Pause controls 242 can allow a supervisor to pause and subsequently resume the dwell countdown, thus allowing a supervisor to continue monitoring the current contact for longer than the dwell time. A supervisor may choose to continue monitoring a contact, for example, when the supervisor believes coaching, barging in, or taking over may be necessary to avoid producing an unhappy customer. Skip-ahead controls 244 can allow a supervisor to stop monitoring the current contact and move on to monitoring the next contact before the dwell time has elapsed. This can allow a supervisor to stop monitoring contacts unlikely to benefit from supervision, for example, when the supervisor recognizes that the contact is unlikely to produce an unsatisfied customer. In several embodiments, selecting a presented contact 202 can deliver the selected contact to the supervisor before the dwell time has elapsed. Go-back controls 246 can allow a supervisor to return to a previously monitored contact. A supervisor may desire to go back to a previous contact, for example, when the scan function replaces a contact, but the supervisor wants to continue monitoring the previous contact.

In some embodiments, supervisors may flag a contact to cause the contact, agent or customer to be considered in a different manner when identifying contacts to present to a supervisor. In certain example embodiments, a supervisor can indicate that a contact has an elevated risk for requiring supervisor intervention, even if the contact does not require supervisor intervention at the time. After flagging the contact, the supervisor can move on to supervising another contact. In some embodiments, criteria for monitoring the flagged contact becomes more sensitive to characteristics that indicate a need for supervision, thus increasing the likelihood that the contact will be presented to the supervisor again when negative characteristics arise. In other embodiments, the flagged contact may be monitored by a supervisor more often than it otherwise would. For example, the flagged contact may be automatically delivered to a supervisor every other or every third contact while the supervisor is scanning contacts. By allowing the supervisor to flag or otherwise elevate the risk of a contact that does not require immediate supervision, the supervisor can move on to monitoring other contacts while ensuring the higher-risk contact still receives extra supervision if necessary. Other flags can be used, for example, to indicate that the agent may have an elevated risk of producing an unsatisfied customer during the agent's shift, a flag can also be used to indicate that a customer may be at risk to become unsatisfied during a future contact. Similarly, a supervisor can "pin" a contact, agent, and/or customer so the particular contact or contacts including a particular agent or customer are always presented to the supervisor when available.

In several embodiments, the supervisor workstation can include communication controls for allowing a supervisor to train agents and/or handle contacts. Communication controls can include controls to: coach the agent 228, barge in on the contact 230, and/or take over the contact 232. In some embodiments, turning on communication controls 226 stops the scan function until communication controls 226 are turned off or scanning is otherwise restarted.

Referring to FIG. 3, in certain embodiments, visual contact media 302 can also be included at a display of the supervisor workstation 200. For example, video of an agent and/or contact in a videoconference- or video-call-based contact can be provided at a display of the supervisor workstation while audio of the contact is delivered to the supervisor through a headset or the like. Text-based contact media can also be provided at a display of the supervisor workstation by displaying the text-based communication between the agent and/or customer of the contact, for example, in place of video media. Audio-based contact media can also be delivered through the supervisor workstation, for example, through a headset worn by the supervisor. In some embodiments, a video feed of the agent can be delivered to a display of the supervisor workstation even when the contact is over a non-video media, for example, chat or phone. In several embodiments, information for the agent workstation 304 & 306 can also be included at the supervisor workstation. The entire agent workstation display as seen by the agent, a portion of the agent workstation display, or representations of some or all of the information can be included at the supervisor workstation. In some embodiments, sensitive information available at the agent workstation display can be redacted so the sensitive information is excluded from the image included at the supervisor workstation. For example, via methods and/or apparatus as described in U.S. patent application Ser. No. 13/182,328, the entirety of which is herein incorporated by reference. In some embodiments, additional items relevant to the contact can be provided automatically to the supervisor at a display of the supervisor workstation. For example, related training manuals or quality assurance checklists and/or forms can be provided for supervisor reference and/or to complete based on the supervisor's observations of a contact.

The embodiments described herein can also be used when two or more supervisors are responsible for at least some of the same agents. For example, when two or more supervisors are assigned to supervise the same team of agents. In some embodiments, contacts presented to a supervisor that are being monitored by another supervisor can be greyed out, removed, or otherwise altered to inform the supervisor that the contact is being supervised. In several embodiments, contacts being supervised are not delivered to another supervisor to avoid redundant supervision. In some embodiments, redundant supervision can be allowed to enable, for example, the training of new supervisors.

Figure 4:
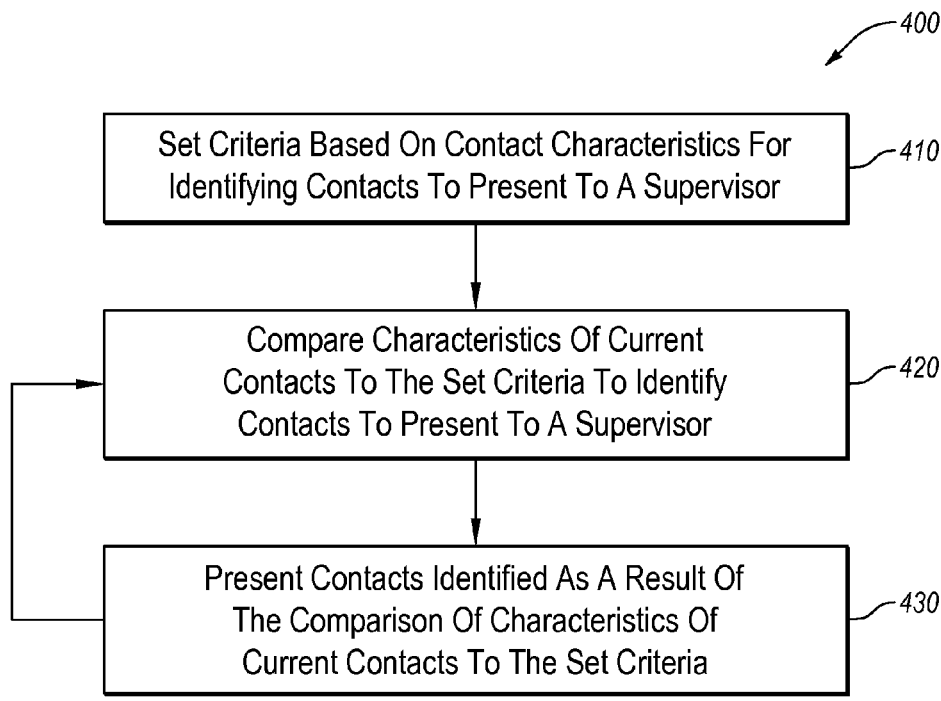
FIG. 4 illustrates a method for presenting contacts based on criteria according to an embodiment.

Referring to FIG. 4, in some embodiments, to identify and present contacts to the supervisor workstation 430, criteria based on contact characteristics can first be set 410. Formulae, algorithms, and other methods of identifying priority contacts may be set by default or set by a contact handling system, a supervisor, or a company using the contact handling system to handle contacts. In certain embodiments, the criteria for determining which contacts are presented to the supervisor can be set and/or altered at the contact handling system, for example, by management of the contact handling system.

In some embodiments, the supervisor may set and/or alter the priority criteria, for example, at a supervisor workstation. In some embodiments, setting presentation criteria can generally be accomplished using a graphic user interface that allows a user to identify one or more characteristics related to desirability that contacts exhibiting the characteristics be presented to a supervisor. As described above, these characteristics can be any characteristic related to the contact, etc. These characteristics can be represented in any way, including as scalar, binary, percentages, combinations of characteristics, text strings, classifications, etc. Once one or more characteristics are identified, the manner in which contacts exhibiting the identified characteristics should be treated in determining which contacts to present to a supervisor is set. In certain embodiments, this can include setting a weighting score for a particular characteristic, identifying the characteristic as desirable or undesirable, prompting the continuation or ceasing of evaluation of a contact, prompting a change in evaluation, etc. The process of identifying characteristics and setting contact treatment based on those characteristics can be repeated for any number of characteristics. In some embodiments, a computer can be programed to identify the characteristics and set and adapt the contact treatment automatically. For example, a computer can be programmed to evaluate characteristics of contacts supervisors focus on supervising (including whispering, barging in, taking over, and/or simply monitoring for an amount of time), identifying correlating characteristics, and setting the system so contacts with those characteristics are more likely to be delivered to the supervisor. In some embodiments, the supervisor can explicitly categorize contacts as desirable or undesirable and use the categorization to identify characteristics.

Contact characteristics are used to identify priority contacts for presentation and/or delivery to a supervisor. To determine which contacts to present to a supervisor, a number of contact characteristics can be considered. The characteristics can be considered in a number of ways by the contact handling system, as discussed in detail further below. Characteristics can relate to the agent, the customer, the circumstances of the contact, occurrences in the contact, or other characteristics of the contact. The discussion of characteristics that follows is not meant as an exhaustive list of all characteristics that can be considered in evaluating contacts. Instead, any identifiable characteristic of a contact can be considered.

In some embodiments, the presence of particular contact characteristics or occurrences may cause the contact to be identified as high-urgency and be presented and/or delivered automatically to the supervisor. In some embodiments, high-urgency contacts are those contacts identified as having a very high likelihood of producing an unsatisfied customer. In some example embodiments, a representation of the high-urgency contact may be presented to the supervisor with an indicator or some other emphasis indicating the characteristics detected and/or the urgency of need for monitoring. In several example embodiments, contacts identified as high-urgency can be delivered to the supervisor automatically if the supervisor is not currently monitoring a high-urgency contact. In other example embodiments, the supervisor can be specially alerted of high-urgency contacts and may choose to interrupt monitoring the current contact to monitor the high-urgency contact. In some embodiments, where a high-urgency contact is identified and two or more supervisors may potentially monitor the contact, supervisor situations and/or characteristics may be considered in determining which supervisor to assign the contact. For example, the priority of the contacts monitored by the supervisors and whether a supervisor is automatically scanning contacts can be considered.

In certain embodiments, priority factors can include quality assurance and/or training targets of the agent. In quality assurance, a supervisor may be expected to monitor agents a particular number of times in a particular period (e.g., each month). As the supervisor monitors these contacts, the supervisor may have a list of review criteria by which to evaluate the agents' handling of contacts. In some embodiments, a quality assurance review form is delivered to the supervisor workstation when the supervisor begins monitoring such a contact. A contact containing an agent that has not been monitored the minimum number of times may be ranked a higher priority than a similar contact containing an agent for whom the supervisor has met his monitoring quota. Similarly, supervisors may be expected to monitor a number of contacts involving new agents in order to train the agent and barge in or take over the contact if necessary. In addition to new agents, supervisors may be required to monitor and train agents learning new skills or handling new contact types.

Other agent-related characteristics may be considered in determining priority contacts. For example, an agent's number and/or rate of refused contacts may be considered. A contact is refused by an agent if the contact is assigned to the agent, but the agent does not accept the contact, e.g., the agent's phone rings, but the agent does not "pick up." A high number and/or rate of refused contacts can possibly indicate the agent is noncompliant. Contacts handled by a noncompliant agent may be at an increased risk of producing an unsatisfied customer. Monitoring the agent's contact(s) can allow the supervisor to confirm the agent's continued effectiveness.

In some embodiments, characteristics of the customer can also be considered in identifying contacts to present to a supervisor. In some embodiments, whether a customer has contacted the contact handling system multiple times over some period may be considered in determining priority contacts. Customers may be identified a number of ways, for example, by browser-based "cookies," IP addresses, an Automatic Number Identifier (ANI), or using other identifying information. Customers who have contacted the contact handling system multiple times in a relatively short time may be more likely to be frustrated or upset, or past dissatisfaction may have been flagged in the contact handling system by the agent of a previous contact from the customer.

Characteristics of the contact can also be considered in identifying contacts to present to a supervisor. In some embodiments, the length of time a customer spends waiting to communicate with an agent can be considered. Excessive on-hold times can cause customer frustration. In addition, contact handling systems are often bound by a service level agreement (SLA) which, among other things, includes maximum limits for caller on-hold times.

In certain embodiments, the contact's assigned queue may also be considered in determining contacts to present to a supervisor. A contact may be assigned to a particular queue of a contact handling system. For example, a contact may be assigned to sales or technical support or the contact may be assigned to a gold-standard or other heightened-service queue as defined by an SLA. The contact may be assigned to a queue as a result of the way the contact was initiated, for example, by the particular phone number dialed or link clicked by the customer. The contact may also be assigned to a particular queue based on customer choices at a menu, for example, as selected from an IVR or a browser-based menu. Contacts assigned to particular queues may have higher priority for supervision than similar contacts assigned to other queues, for example, heightened-service contacts may be a higher priority than sales contacts.

Other contact characteristics may be considered in determining which contact to present to a supervisor. For example, whether a contact was re-agented (i.e., transferred from one agent to another) or re-skilled (i.e., transferred from one queue to another). Contact length, customer on-hold time, and/or customer on-hold time exceeding the on-hold time allowed by the SLA can be considered in determining contacts to present to a supervisor.

In some embodiments, the rate at which a particular characteristic or characteristics change may be considered. For example, a contact with a characteristic that has changed a relatively large degree over a relatively short period of time may be more likely to be presented to a supervisor than a contact experiencing the same degree of change over a longer period of time.

In some embodiments, agents may be assigned a risk factor representing generally the agent's likelihood of providing a low quality of care. For example, an agent that has produced a comparably high rate of frustrated customers (as indicated by a post-contact survey, supervisor monitoring, or other means) may be assigned a comparably high risk factor. Conversely, an agent that has produced a comparably low rate of frustrated customers may be assigned a comparably low risk factor. In some embodiments, some criteria can be weighed more or less heavily based on an agent risk factor.

Whether a supervisor has monitored a particular contact can also be considered. For example, a contact that has been monitored by a supervisor may not be presented to the supervisor again or to another supervisor if multiple supervisors are responsible for the same contact. In some embodiments, a previously-supervised contact may be presented to a supervisor again, for example, when a particular characteristic or characteristics arise, or change dramatically and/or quickly. In some embodiments, a supervisor may flag a contact as high-risk, which may be considered when determining which contacts to present. In still other embodiments, a supervisor may "pin" a contact so it remains presented to the supervisor after the supervisor has moved on to monitoring a different contact.

3. Example Embodiments of Communication Monitoring

In some embodiments, communication exchanged between a customer and agent during a contact can be monitored for indications that the contact has a high risk of being perceived as providing a low quality of care. In some embodiments, the communication can be monitored for negative moods of the customer and/or agent. Communication analysis can potentially provide a highly direct way of identifying customer displeasure. For example, speech and/or text analytics can monitor for instances of a customer directly declaring their displeasure regarding the contact.

In several embodiments, the results of contact communication monitoring can be considered as a characteristic of the contact for use in determining which contacts to present to a supervisor. For example, communication of a contact may be given a score identifying the estimated negative mood present in the contact communication. In some embodiments, the presence of particular communication attributes or occurrences may cause the contact to be identified as high-urgency and to be presented and/or delivered automatically to the supervisor. For example, detection of curse words, statements of customer displeasure, yelling, crying, etc. in contact communication may cause the contact to be identified as high-urgency and be presented to a supervisor.

In some embodiments, audio-based communication can be monitored using real-time speech analytics to identify the use of particular words or phrases that may indicate agitation, frustration, and other negative moods. Audio-based communication can also be monitored for changes in volume, tone, pitch, rate of speech, etc. that can also indicate a negative mood shift. In an example embodiment, audio-based communication can be monitored for an increase in communication volume. An increase in communication volume may indicate that the customer and/or agent are yelling, agitated, or otherwise becoming frustrated. Much work has been done to identify mood and/or emotions based on analysis of speech, for example, see Ayadi, M. E., et al., *Survey on speech emotion recognition*, Pattern Recognition 44, 572-587 (2011), the entirety of which is incorporated herein by reference; and Iliou, T & Anagnostopoulos, C.-N., *Statistical evaluation of speech features for emotion recognition*, Digital Telecommunications 2009, 121-126, the entirety of which is incorporated herein by reference.

In several embodiments, text-based communication may also be monitored for the use of particular words and phrases or other indications of emotion and/or mood. Techniques for determining emotion and/or mood of text-based communication are known; for example, see Kao E. C.-C., et al. *Towards text-based emotion detection*, Information Management and Engineering 2009, 70-74, the entirety of which is incorporated herein by reference. Emotion and/or mood can be determined through keystroke dynamics of the agent and customer where the customer's keystroke information is available. An increase in typing speed, errors, deletions, key hold times, etc. can indicate a customer or agent is becoming agitated or otherwise frustrated. Recently, work has been done to develop techniques to identify mood and/or emotions based on analysis of speech, for example, see Epp, C., et al., *Identifying emotional states using keystroke dynamics*, CHI '11, 715-724 (2011), the entirety of which is incorporated herein by reference.

In some embodiments, video-based contacts can be monitored in real-time for facial expressions of the customer and/or agent. Contacts containing a relatively high portion of negative facial expressions can indicate a customer and/or agent is becoming agitated or frustrated. Techniques for determining emotion and/or mood through automatic analysis of facial expressions are known; for example, see Fasel, B. & Luettin, J., *Automatic Facial Expression Analysis*, Pattern Recognition 36, 259-275 (2003), the entirety of which is incorporated herein by reference.

Figure 5:
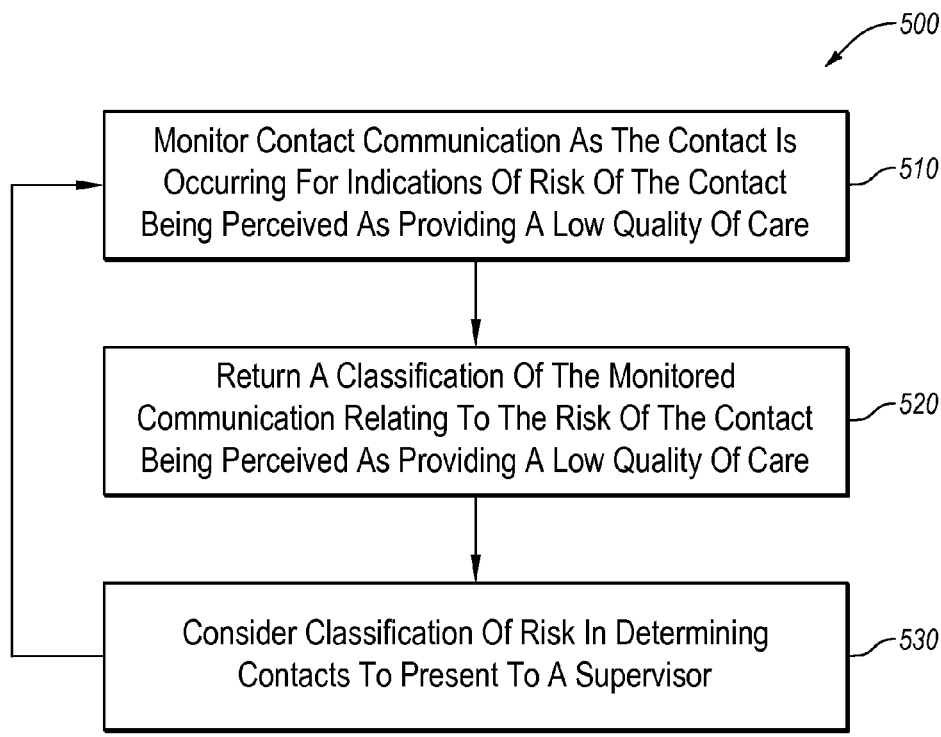
FIG. 5 illustrates a method for considering contact communication in identifying contacts to present to a supervisor according to an invention.

With reference to FIG. 5, in some embodiments, contact communications are monitored as the contact is occurring for indications that the contact is at risk of being perceived as providing a low quality of care 510. The communication monitoring can include any aspect of the communication, for example, speech, text, video, etc. As a result of the monitoring, a classification can be returned relating to the risk of the contact being perceived as providing a low quality of care 520. The classification can be binary, scalar, a general classification such as high, medium or low, or the like. The classification can also be more complex, for example, a mood of the customer or agent, or the percent of time negative faces are made in a video communication. The contact handling system can then consider the classification in determining which contacts to present to a supervisor 530. For example, considering classifications can be done in any manner described herein. These steps can be continuously repeated to detect and reflect changing circumstances of contacts.

Research, algorithms and commercially available software is publically available for performing real-time speech analytics, text and keystroke analytics, and real-time facial expression recognition. These methods and systems can be adapted and scaled for use in a contact handling system. In certain embodiments, monitoring contact communication is handled at a media server of the contact handling system. In other embodiments, a different component of the contact handling system can monitor contact communication, including a separate and/or dedicated computing device.

In some embodiments, an agent can use an agent workstation to signal a supervisor for monitoring or otherwise flag a contact as having increased risk of producing a frustrated customer. In certain embodiments, the agent's action can be considered as a contact characteristic to be used in determining which contacts to present to a supervisor. In some embodiments, a contact signaled or flagged by an agent may be identified as high-urgency and can be presented and/or delivered to a supervisor as a high-urgency contact.

4. Example Embodiments of Identifying Contacts to Present to a Supervisor

Referring again to FIG. 4, in some embodiments, characteristics of current contacts can be compared to set criteria to identify contacts to present to a supervisor 420. Identifying contacts to present to a supervisor can be accomplished by considering characteristics and/or circumstances of the agent, customer and/or contact. For example, characteristics described above and/or similar characteristics can be considered. Individual contact characteristics can be considered, as can combinations of characteristics, changes in one or more characteristics, etc. Any manner of considering contact characteristics against set criteria can be used. In some embodiments, contact characteristics are assigned values on a numerical scale and are used in formulae to determine which contacts to present to a supervisor. In certain embodiments, algorithms can consider contact characteristics to determine whether a contact should be presented to a supervisor. In several embodiments, combinations of algorithms and formulae can be used.

In some embodiments, the priority score of a particular contact can be demonstrated by the following formula:

$$\text{Priority Score} = \Sigma W_i C_i$$

Where $W_i$ is the weighting score associated with a characteristic of the contact and $C_i$, is the value of the characteristic. The weighting score is multiplied by the characteristic value and summed to produce a priority score. In some embodiments, the characteristic score can represent a binary state, i.e., the contact either possesses a characteristic or it does not. In some other embodiments, the characteristic score can represent a magnitude. In some embodiments, the sum of the weighting scores can be constrained to a particular value, i.e., 100%, 1000 or 1. In some embodiments, the sum of the weighting scores is not constrained.

In an example embodiment, the prioritizing system classifies contact characteristics as binary states, i.e., the contact either possesses the characteristic or it does not. In reference to the formula described above, characteristics with binary states can be represented as a one when the contact possesses the characteristic or a zero when the contact does not. Thus, the weighting scores associated with characteristics actually possessed by a contact are summed to give the contact a priority score. For example, a priority score can be increased by ten (an example of a weighting score) when a contact is re-agented (an example of a characteristic).

Prioritizing methods that consider contact characteristics only as binary states can account for magnitude in a number of ways. In one example, magnitudes can be divided into ranges with different weighting scores associated with each range. In an example embodiment, a contact's priority score might be increased by ten points if the customer has been waiting for three to five minutes or increased by thirty if the customer has been waiting for ten to fifteen minutes. Magnitudes may also be accounted for by aggregating weighting factors. In an example embodiment, contacts that have been ongoing for more than ten minutes may have a priority score increased by five points; contacts that have been ongoing for more than fifteen minutes may have a priority score increased by ten points. In this example embodiment, a contact that has been ongoing for sixteen minutes will have its priority score increased by fifteen points based on the length of the contact. It will be appreciated that there are other ways to account for magnitudes in prioritizing systems that consider characteristics as binary states.

In some embodiments, characteristics can be represented by magnitudes in calculating a priority score. The weighting score can represent the magnitude the priority score should be adjusted according to the corresponding characteristic's unit of magnitude. For example, a weighting score for wait time exceeding the allowable time under a governing SLA may be set at eight points per minute. In calculating priority scores, a combination of binary states and magnitudes can be used.

Weighting scores and characteristic values can be set to decrease the priority score when certain characteristics are found. For example, a negative weighting score can be set so prior supervision can cause a priority score to decrease. In another example, a characteristic value may defined as the customer wait time subtracted by the maximum wait time set by the governing SLA; before the maximum wait time is reached, the characteristic value is negative, and after the maximum wait time is reached, the characteristic value is positive.

The example formula demonstrated above is a simple summing function. However, more complex formulae may be used to calculate priority scores. For example, an algebraic string including basic and/or complex calculus, trigonometric, statistical and/or other functions can be used to calculate a priority score. In some embodiments, multiple priority scores can be generated for a contact. For example, a priority score can be generated that represents contacts' training and/or quality assurance priority. Such a priority score might be used to present contacts in a situation as depicted in FIG. 2B. Another priority score can be generated for contacts' risk priority. Such a priority score might be used to present contact in a situation as depicted in FIG. 2C. A combined priority score can be used to identify overall contact priority. In some embodiments, overall priority is determined as a function of training and/or quality assurance priority scores and risk priority scores. In certain embodiments, a separate overall score can be generated.

In some embodiments, decision making algorithms can be used to identify contacts to present to a supervisor. In several embodiments, this can resemble flowchart decision making. In some example embodiments, the algorithm can resemble a series of criteria for selecting contacts to display. In an example embodiment, the algorithm first presents all contacts with a particular set of characteristics (e.g., high-urgency contacts), then presents some of the remaining contacts according to another set of characteristics (e.g., all contacts with wait time over the SLA that have been re-agented, transferred, or re-skilled), and so on. The algorithms can include any number of sets of characteristics and can be presented to the supervisor in a particular order, for example, high-urgency contacts can be presented above all others if in a list.

In some embodiments, combinations of methods for determining priority contacts are used. For example, a subset of contacts may be selected based on criteria, while weighting scores may be applied to the remaining subset of contacts to determine priority scores. In some embodiments, more complex schemes can be used. For example, weighting scores can be applied differently to contacts based on criteria, e.g., contact meeting a first set of criteria can be give a priority score based on a first set of weighting scores, while contacts meeting a second set of criteria can be given a priority score based on a second set of weighting scores.

In some embodiments, formulae, algorithms, and other methods of identifying priority contacts can account for a change in circumstances of the contact handling system. For example, if supervisors have a weekly monitoring quota for particular agents, contacts that may help the supervisor fulfill the quotas may be given higher priorities as the quota period draws closer to its end. It will be appreciated that other information can be taken into account in determining contact priority, for example, agents' work schedules can be considered to determine priority for quota filling and/or to determine high-risk contacts, e.g., if the contact involves an agent nearing the end of a long shift. In some example embodiments, time zone, almanac (e.g., sunrise, sunset times), and/or weather data of the customer's location can be considered when the customer's location is available.

5. Example Architecture

The embodiments described herein may include the use of a special purpose or general-purpose computer including various computer hardware or software modules, as discussed in greater detail below.

Embodiments within the scope of the present invention also include tangible computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

FIG. 6 and the following discussion are intended to provide a brief, general description of a suitable computing environment in which several embodiments may be implemented. For example, referring to FIG. 1, FIG. 6 may illustrate an example of various components of an agent workstation 145, a customer computing device connected to a network 140, and/or a control server 135, media server 100, ACD 105, IVR, or other device. FIG. 6 can also illustrate a means and steps for accomplishing various functionality and acts disclosed herein. For example, FIG. 6 as a specially programmed computer can illustrate a means for opening contact media connection paths, closing contact media connection paths, determining that confidential communication is to be provided, transitioning between contact media, communicating over parallel contact media, determining contact information for a contact using social media, performing machine translation, identifying language type from received communication, performing speech synthesis and/or speech recognition as well as other acts and algorithms disclosed herein. FIG. 6 can also illustrate a means for sending and receiving various contact media, including but not limited to: faxes, instant message chat, electronic mail, landline phone calls, mobile phone calls, Voice over IP calls, SMS messages, MMS messages, social media communication, video calls, teleconferencing, videoconferencing, etc. Although not required, several embodiments will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps disclosed herein.

Those skilled in the art will appreciate that the embodiments illustrated herein may be practiced in network computing environments with many types of computer system configurations, including personal computers, hand-held devices, mobile phones, multi-processor systems, microprocessor-based or programmable consumer electronics, network PCs, minicomputers, mainframe computers, and the like. Several embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an example of a contact handling system for implementing several embodiments is illustrated, which includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624. Such components, or similar components, may also embody a workstation for a company representative.

The computer 620 may also include a magnetic hard disk drive 627 for reading from and writing to a magnetic hard disk 639, a magnetic disk drive 628 for reading from or writing to a removable magnetic disk 629, and an optical disk drive 630 for reading from or writing to removable optical disk 631 such as a CD-ROM, DVD, or other optical media. The magnetic hard disk drive 627, magnetic disk drive 628, and optical disk drive 630 are connected to the system bus 623 by a hard disk drive interface 632, a magnetic disk drive-interface 633, and an optical drive interface 634, respectively. The drives and their associated computer-readable media provide non-volatile storage of computer-executable instructions, data structures, program modules and other data for the computer 620. Although the environment described herein employs a magnetic hard disk 639, a removable magnetic disk 629 and a removable optical disk 631, other types of computer readable media for storing data can be used, including magnetic cassettes, flash memory cards, digital versatile disks, Bernoulli cartridges, RAMs, ROMs, millipede memory, and the like.

Program code means comprising one or more program modules may be stored on the hard disk 639, magnetic disk 629, optical disk 631, ROM 624 or RAM 625, including an operating system 635, one or more training and work management programs 636, other program modules 637, and program data 638, such as company representative proficiencies and status. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port, or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, workstations of company representatives, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a LAN 651 and a WAN 652 that are presented here by way of example and not limitation. Such networking environments are commonplace in office-wide or enterprise-wide computer networks, intranets and the internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 for serially transitioning between contact media types, adding desired delay to contacts, opening and closing parallel communication paths, submitting confidential communication, employing machine translation, and employing social media to facilitate contacts.

Features from any of the disclosed embodiments may be used in combination with one another, without limitation. In addition, other features and advantages of the present disclosure will become apparent to those of ordinary skill in the art through consideration of the detailed description and the accompanying drawings. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for improving supervisor efficiency in a contact handling system by automatically identifying and presenting contacts associated with a risk of producing a negative customer response, the method comprising:
   electronically monitoring real-time communication between an agent and a customer associated with a contact for one or more characteristics of the communication, using a computer programmed to electronically monitor communication;
   automatically identifying, using the computer, that the contact includes a risk of producing a negative customer response based on the one or more characteristics of the communication;
   presenting the identified contact to a supervisor; and
   presenting one or more supervisor actions to the supervisor, wherein the supervisor actions include one or more of: coaching, barging in, and taking over,
   wherein the contact handling system includes:
      an agent workstation, which allows an agent to interact with contacts, contact media, supervisors, and the contact handling system;
      a supervisor workstation, which allows a supervisor to interact with contacts, including agents and contacts, contact media, and the contact handling system;
      a media server, which handles connection paths for contact media;
      an automatic contact distributor, which tracks the state of each contact and agent, the automatic contact distributor supplying available agents with waiting contact media; and
      an interactive voice response unit, which provides pre-recorded audio prompts to incoming voice contact media.

2. The method of claim 1, wherein:
   electronically monitoring the communication includes monitoring a rate of change in the characteristics of the communication.

3. The method of claim 1, wherein the communication between the agent and the customer includes audio-based communication.

4. The method of claim 3, wherein electronically monitoring the characteristics of the communication includes performing real-time speech analytics on the audio-based communication associated with the communication between the agent and the customer.

5. The method of claim 4, wherein identifying one or more characteristics indicating the contact includes an above-average risk of producing a negative customer response includes detecting, via real-time speech analytics, a change in acoustic features of the audio-based communication.

6. The method of claim 4, wherein identifying one or more characteristics indicating the contact includes a risk of producing a negative customer response includes identifying an increase in volume associated with the audio-based communication.

7. The method of claim 4, wherein identifying one or more characteristics indicating the contact includes a risk of producing a negative customer response includes detecting, via real-time speech analytics, the use of one or more words correlated with contacts including a risk of producing a negative customer response.

8. The method of claim 4, wherein identifying one or more characteristics indicating the contact includes a risk of producing a negative customer response includes detecting, via real-time speech analytics, one or more emotions correlated with contacts including a risk of producing a negative customer response.

9. The method of claim 8, wherein:
   monitoring the characteristics of the communication includes keystroke dynamics analysis; and
   identifying one or more characteristics indicating the contact includes a risk of producing a negative customer response includes detecting, via keystroke dynamics analysis, one or more keystroke characteristics correlated with contacts including a risk of producing a negative customer response.

10. The method of claim 1, wherein the communication between the agent and the customer includes text-based communication.

11. The method of claim 10, wherein identifying one or more characteristics indicating the contact includes a risk of producing a negative customer response includes detecting the use of one or more words correlated with contacts including a risk of producing a negative customer response.

12. The method of claim 1, wherein the communication between the agent and the customer includes video-based communication.

13. The method of claim 12, wherein:
   monitoring the characteristics of the communication includes real-time motion tracking; and
   identifying one or more characteristics indicating the contact includes an above-average risk of producing a negative customer response includes detecting, via real-time motion tracking, agitated movement by the customer or agent of the contact.

14. A method for improving supervisor efficiency in a contact handling system by automatically identifying and presenting contacts associated with a risk of producing negative customer responses, the method comprising:
   electronically monitoring real-time facial expressions in communication between an agent and a customer associated with a contact using a computer programmed to electronically monitor facial expressions in real-time;
   automatically identifying, using the computer, that the contact includes an above-average risk of producing a negative customer response based at least in part on detecting one or more facial expressions correlated with contacts including an above-average risk of producing a negative customer response; and
   presenting the identified contact to a supervisor.

15. The method of claim 14, wherein monitoring real-time facial expressions includes monitoring a rate of change in facial expressions.

16. A contact handling system comprising:
an agent workstation, which allows an agent to interact with customers, media, and the contact handling system;
a supervisor workstation, which allows a supervisor to interact with contacts, including agents and contacts, contact media, and the contact handling system;
a media server, which handles connection paths for media;
an automatic contact distributor, which tracks the state of contacts and agents accessing the contact handling system, supplying available agents with waiting media;
an interactive voice response unit, which provides pre-recorded audio prompts to incoming voice contact media
an electronic processor; and
a tangible non-transitory computer readable medium having executable instructions stored thereon for performing a method for improving supervisor efficiency in a contact handling system by automatically identifying and presenting contacts associated with a risk of producing a negative customer response, the method including:
 monitoring, in real-time at the media server, for one or more characteristics of a communication between the agent and a customer associated with a contact;
 identifying, based at least in part on the characteristics of the communication, that the contact includes a risk of producing a negative customer response;
 presenting the identified contact to a supervisor; and
 presenting one or more supervisor actions to the supervisor, wherein the supervisor actions include one or more of: coaching, barging in, and taking over.

17. The contact handling system of claim 16, wherein monitoring the characteristics of the communication includes real-time speech analytics.

18. The contact handling system of claim 16, wherein identifying that the contact includes a risk of producing a negative customer response includes detecting the use of one or more words correlated with contacts including a risk of producing a negative customer response.

* * * * *